(12) United States Patent
Cantrell et al.

(10) Patent No.: US 12,236,700 B1
(45) Date of Patent: Feb. 25, 2025

(54) SYSTEM FOR AUTOMATICALLY PROCESSING DOCUMENTS

(71) Applicant: Capital One Services, LLC, McLean, VA (US)

(72) Inventors: Thomas Oliver Cantrell, Maidens, VA (US); Joseph James Ford, III, Manakin Sabot, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/785,077

(22) Filed: Jul. 26, 2024

(51) Int. Cl.
*G06V 30/414* (2022.01)
*G06V 10/77* (2022.01)
*G06V 10/82* (2022.01)
*G06V 30/19* (2022.01)

(52) U.S. Cl.
CPC ........ *G06V 30/414* (2022.01); *G06V 10/7715* (2022.01); *G06V 10/82* (2022.01); *G06V 30/19127* (2022.01)

(58) Field of Classification Search
CPC .......... G06V 30/414; G06V 30/19127; G06V 10/7715; G06V 10/82
See application file for complete search history.

(56) References Cited

U.S. PATENT DOCUMENTS

| | | | |
|---|---|---|---|
| 5,515,451 A | 5/1996 | Tsuji et al. | |
| 7,391,934 B2 | 6/2008 | Goodall et al. | |
| 7,421,107 B2 | 9/2008 | Lugg | |
| 7,526,117 B2 | 4/2009 | Foth et al. | |
| 7,587,066 B2 | 9/2009 | Cordery et al. | |
| 7,698,222 B1 | 4/2010 | Bueche | |
| 7,702,588 B2 | 4/2010 | Gilder et al. | |
| 7,734,545 B1 | 6/2010 | Fogliano et al. | |
| 7,818,307 B1 | 10/2010 | Young et al. | |
| 7,856,402 B1 | 12/2010 | Kay | |

(Continued)

FOREIGN PATENT DOCUMENTS

| | | | |
|---|---|---|---|
| JP | 2020021419 A | 2/2020 | |
| KR | 2570769 B1 | 8/2023 | |

OTHER PUBLICATIONS

Rose, Lydia M. "Modernizing check fraud detection with machine learning." PhD dissertation. Utica College. 2018.

(Continued)

*Primary Examiner* — Utpal D Shah
(74) *Attorney, Agent, or Firm* — Sterne, Kessler, Goldstein & Fox P.L.L.C.

(57) ABSTRACT

A computer implemented method, system, and non-transitory computer-readable device that may be used in a remote deposit environment. A plurality of differing neural networks, such as customizable neural networks, are selected, based on an architecture and features of the data field, to extract data from specific data fields on a document. The selected customizable neural networks are trained by historical or synthetic data corresponding to the data fields. Upon receiving, from a neural network Optical Character Recognition (OCR) system, a selected first trained customizable neural network model and at least a second selected trained customizable neural network model, the data fields are extracted, based on a series or parallel configuration of the customizable neural networks, and the extracted data communicated to a remote deposit process.

20 Claims, 10 Drawing Sheets

(56) References Cited

U.S. PATENT DOCUMENTS

| | | | |
|---|---|---|---|
| 7,905,396 B2 | 3/2011 | Tidwell et al. |
| 7,949,587 B1 | 5/2011 | Morris et al. |
| 8,027,928 B1 | 9/2011 | Hecht, Jr. et al. |
| 8,050,997 B1 | 11/2011 | Nosek et al. |
| 8,060,442 B1 | 11/2011 | Hecht et al. |
| 8,104,676 B2 | 1/2012 | Ramachandran |
| 8,213,782 B2 | 7/2012 | Jelinek |
| 8,271,381 B2 | 9/2012 | O'Brien et al. |
| 8,290,876 B1 | 10/2012 | Powell |
| 8,296,230 B2 | 10/2012 | Davis et al. |
| 8,300,917 B2 | 10/2012 | Borgia et al. |
| 8,332,329 B1 | 12/2012 | Thiele |
| 8,406,500 B2 | 3/2013 | Najari et al. |
| 8,464,933 B1 | 6/2013 | Prasad et al. |
| 8,582,862 B2 | 11/2013 | Nepomniachtchi et al. |
| 8,605,982 B2 | 12/2013 | Jackson et al. |
| 8,626,661 B2 | 1/2014 | Gilder |
| 8,632,001 B1 | 1/2014 | Ramachandran et al. |
| 8,638,363 B2 | 1/2014 | King et al. |
| 8,639,105 B2 | 1/2014 | Ogino |
| 8,708,227 B1 | 4/2014 | Oakes, III et al. |
| 8,745,073 B2 | 6/2014 | Mulligan et al. |
| 8,811,711 B2 | 8/2014 | Calman et al. |
| 8,885,963 B2 | 11/2014 | Coleman |
| 8,958,605 B2 | 2/2015 | Amtrup et al. |
| 8,959,033 B1 | 2/2015 | Oakes, III et al. |
| 8,983,170 B2 | 3/2015 | Nepomniachtchi et al. |
| 8,995,012 B2 | 3/2015 | Heit et al. |
| 9,064,248 B2 | 6/2015 | Huff et al. |
| 9,324,073 B2 | 4/2016 | Nepomniachtchi et al. |
| 9,384,392 B2 | 7/2016 | Weber et al. |
| 9,483,761 B2 | 11/2016 | Brendell et al. |
| 9,558,493 B2 | 1/2017 | Carrott |
| 9,569,756 B1 | 2/2017 | Bueche, Jr. et al. |
| 9,640,041 B2 | 5/2017 | Block et al. |
| 9,652,690 B2 | 5/2017 | Eid et al. |
| 9,672,510 B2 | 6/2017 | Roach et al. |
| 9,679,281 B2 | 6/2017 | Moshal |
| 9,684,920 B2 | 6/2017 | Kalgi et al. |
| 9,721,177 B2 | 8/2017 | Lee et al. |
| 9,747,509 B2 | 8/2017 | Eid et al. |
| 9,779,392 B1 | 10/2017 | Prasad et al. |
| 9,807,263 B2 | 10/2017 | Bala et al. |
| 9,852,406 B2 | 12/2017 | Doyle et al. |
| 9,852,409 B2 | 12/2017 | Artman et al. |
| 10,026,119 B2 | 7/2018 | Green et al. |
| 10,192,108 B2 | 1/2019 | Nepomniachtchi et al. |
| 10,210,522 B1 | 2/2019 | Medina, III et al. |
| 10,217,375 B2 | 2/2019 | Waldron et al. |
| 10,402,790 B1 | 9/2019 | Clark et al. |
| 10,460,381 B1 | 10/2019 | Pollack et al. |
| 10,504,185 B1 | 12/2019 | Buentello |
| 10,552,810 B1 | 2/2020 | Ethington et al. |
| 10,635,898 B1 | 4/2020 | Pribble et al. |
| 10,692,230 B2 | 6/2020 | Anderson et al. |
| 10,699,146 B2 | 6/2020 | Shustorovich et al. |
| 10,706,466 B1 | 7/2020 | Ethington et al. |
| 10,762,579 B2 | 9/2020 | Riechers et al. |
| 10,769,598 B1 | 9/2020 | Oakes, III et al. |
| 10,789,496 B2 | 9/2020 | Kotovich et al. |
| 10,853,771 B2 | 12/2020 | Enobakhare |
| 10,855,914 B1 | 12/2020 | Prasad et al. |
| 10,909,362 B2 | 2/2021 | Nepomniachtchi et al. |
| 11,064,111 B1 | 7/2021 | Prasad et al. |
| 11,068,867 B1 | 7/2021 | Tucker |
| 11,126,975 B2 | 9/2021 | Haldenby et al. |
| 11,127,008 B1 | 9/2021 | Buentello et al. |
| 11,145,169 B2 | 10/2021 | Pratten et al. |
| 11,157,731 B2 | 10/2021 | Nepomniachtchi et al. |
| 11,159,733 B2 | 10/2021 | Mukul |
| 11,200,550 B1 | 12/2021 | Singfield |
| 11,210,379 B1 | 12/2021 | Lindley et al. |
| 11,216,884 B1 | 1/2022 | Buentello |
| 11,222,313 B2 | 1/2022 | Doyle et al. |
| 11,244,302 B2 | 2/2022 | Ekpenyong et al. |
| 11,244,319 B2 | 2/2022 | Navarro et al. |
| 11,282,086 B1 | 3/2022 | Medina, III et al. |
| 11,288,661 B2 | 3/2022 | Hammad et al. |
| 11,295,377 B1 | 4/2022 | Ethington et al. |
| 11,295,378 B1 | 4/2022 | Voutour et al. |
| 11,315,217 B2 | 4/2022 | Ilic et al. |
| 11,321,709 B1 | 5/2022 | Kolchin |
| 11,373,150 B1 | 6/2022 | Bueche, Jr. et al. |
| 11,449,841 B1 | 9/2022 | Srinivasarangan et al. |
| 11,516,383 B2 | 11/2022 | Ilic et al. |
| 11,531,973 B1 | 12/2022 | Prasad et al. |
| 11,539,848 B2 | 12/2022 | Roach et al. |
| 11,562,332 B1 | 1/2023 | Oakes, III et al. |
| 11,610,294 B2 | 3/2023 | Dewitt et al. |
| 11,640,627 B2 | 5/2023 | Fotso et al. |
| 11,676,285 B1 | 6/2023 | Backlund et al. |
| 11,682,222 B1 | 6/2023 | Oakes, III et al. |
| 11,694,268 B1 | 7/2023 | Buentello |
| 11,704,627 B2 | 7/2023 | Gordon et al. |
| 11,710,210 B1 | 7/2023 | Medina, III |
| 11,798,253 B2 | 10/2023 | Pribble et al. |
| 11,810,382 B2 | 11/2023 | Laza et al. |
| 11,829,962 B2 | 11/2023 | Burnam et al. |
| 11,900,755 B1 | 2/2024 | Bueche, Jr. |
| 12,039,504 B1* | 7/2024 | Foster ................ G06Q 20/4016 |
| 2005/0283444 A1 | 12/2005 | Ekberg |
| 2006/0036537 A1 | 2/2006 | Lawrence et al. |
| 2008/0140579 A1 | 6/2008 | Agarwal |
| 2009/0171839 A1 | 7/2009 | Rosano et al. |
| 2012/0040717 A1 | 2/2012 | Levy et al. |
| 2013/0013491 A1 | 1/2013 | Selway et al. |
| 2013/0054461 A1 | 2/2013 | Gupta et al. |
| 2013/0176473 A1 | 7/2013 | Ogino |
| 2013/0198069 A1 | 8/2013 | Latimer |
| 2013/0204783 A1 | 8/2013 | Klose et al. |
| 2014/0074697 A1 | 3/2014 | Foster |
| 2014/0114852 A1 | 4/2014 | Rajagopal et al. |
| 2014/0122332 A1 | 5/2014 | Viera et al. |
| 2014/0236767 A1 | 8/2014 | Duggal et al. |
| 2015/0032626 A1 | 1/2015 | Dill et al. |
| 2015/0120564 A1 | 4/2015 | Smith et al. |
| 2017/0270508 A1 | 9/2017 | Roach et al. |
| 2017/0309108 A1 | 10/2017 | Sadovsky et al. |
| 2017/0336511 A1 | 11/2017 | Nerurkar |
| 2018/0234472 A1 | 8/2018 | Malakar |
| 2019/0266445 A1* | 8/2019 | Chen ...................... G06V 20/62 |
| 2020/0042955 A1 | 2/2020 | Widdows |
| 2020/0334647 A1 | 5/2020 | Malhotra et al. |
| 2020/0389600 A1 | 12/2020 | Capurso et al. |
| 2021/0034856 A1* | 2/2021 | Torres ................ G06V 30/414 |
| 2021/0064861 A1* | 3/2021 | Semenov ............... G06F 17/16 |
| 2021/0125034 A1* | 4/2021 | Nguyen ................ G06N 3/084 |
| 2021/0174361 A1 | 6/2021 | Potireddy et al. |
| 2021/0295626 A1* | 9/2021 | Yamaguchi ............ G07C 9/22 |
| 2021/0360149 A1* | 11/2021 | Mukul .................... G06F 3/165 |
| 2022/0198182 A1* | 6/2022 | Semenov ............. G06F 40/216 |
| 2022/0245985 A1 | 8/2022 | Bhutani et al. |
| 2022/0277291 A1 | 9/2022 | Roongta et al. |
| 2022/0335393 A1 | 10/2022 | Gupta et al. |
| 2022/0343301 A1 | 10/2022 | Edwards et al. |
| 2022/0358575 A1 | 11/2022 | Smith |
| 2023/0060395 A1 | 3/2023 | Roach et al. |
| 2023/0060464 A1 | 3/2023 | Ceesay |
| 2023/0084370 A1 | 3/2023 | Bradford |
| 2023/0120865 A1 | 4/2023 | Nascimento et al. |
| 2023/0133158 A1 | 5/2023 | Kolchin |
| 2023/0196319 A1 | 6/2023 | Ng et al. |
| 2023/0196706 A1 | 6/2023 | Scott |
| 2023/0209116 A1 | 6/2023 | Leung et al. |
| 2023/0281629 A1 | 9/2023 | Shevyrev et al. |
| 2023/0289808 A1 | 9/2023 | Kolchin |
| 2023/0351782 A1* | 11/2023 | Fitzgerald .............. G06V 30/42 |
| 2023/0376687 A1* | 11/2023 | Morariu ............... G06F 40/279 |
| 2024/0169752 A1* | 5/2024 | Semenov .............. G06V 10/82 |

(56) References Cited

OTHER PUBLICATIONS remotedepositcapture.com, "Ensenta Business Mobile with Multi-Check", Available from the Internet at https://www.remotedepositcapture.com/RDC/media/RDC-Forum/Submitted-Sponsor-Brochures/EnsentaBusinessMobileMultiCheck-e-_2018_2_14_12_52_3.pdf, [site visited on May 19, 2023], pp. 1-2.

Bills, Steve, "Automated Amount Scanning Is Trend in Remote-Deposit," American Banker, New York, NY, Aug. 30, 2005, (4 pgs).

Dunga et al. "Electronic Booking and Payment Platforms for Inter-Campus E-Bikes". Engineering Proceedings. Jul. 14, 2023. pp. 1-14. vol. 41, Issue 12.

ALETIHADPAYMENTS. "Aani | Split the bill with your friends". Oct. 16, 2023. Located via YouTube, free available at https://www.youtube.com/watch?v=_wys12-0KmE.

Katariya. "Mastering QR Code Payments: A Guide to Seamless and Effortless Transactions". Jun. 12, 2023. Located via Google Web, free copy available at https://www.mooninvoice.com/blog/qr-code-payments/.

PayBy. "PayBy: Easily Split Bills of Group Expenses". Retrieved from the Internet on Dec. 21, 2023. Located via Google Web, free copy available at https://www.payby.com/split-bills.

Natwest. "Request money from someone or split a bill". Retrieved from the Internet on Dec. 21, 2023. Located via Google Web, free available at https://www.natwest.com/waystopay/payme.html.

SpotOn. "QR Scan & Pay / Order & Pay | SpotOn Order". Jul. 19, 2023. Located via Google Web, free available at https://help.spoton.com/space/SK/2457829381/QR+Scan+%26+Pay+%2F+Order+%26+Pay+%7C+SpotOn+Order.

SpotOn. "Qr Split Payment | SpotOn Order". Jul. 19, 2023. Located via Google Web, free copy available at https://help.spoton.com/space/SK/2262565040/QR+Split+Payment+%7C+SpotOn+Order.

photo.stackexchange.com, "What of those EXIF values tell me more about my image's quality?" Jul. 8, 2017, Photography Stack Exchange, Located via Google Web, available at https://photo.stackexchange.com/questions/90730/what-of-those-exif-values-tell-me-more-about-my-images-quality.

Abraham, "Moiré Pattern Detection using Wavelet Decomposition and Convolutional Neural Network," Amadeus Software Labs Pvt. Ltd, IEEE (2018).

Yang, et al., "Doing More with Moiré Pattern Detection in Digital Photos," Journal of Latex Class Files, vol. 14, No. 8 (Aug. 2021).

Digital Check, "Money Orders Giving You Trouble? We've Got The Solution!" Oct. 1, 2008. Located via Google Web, available at https://www.digitalcheck.com/moneyorders-dcom/.

\* cited by examiner

SYSTEM FOR AUTOMATICALLY PROCESSING DOCUMENTS

BACKGROUND

As financial technology evolves, banks, credit unions and other financial institutions have found ways to make online banking and digital money management more convenient for users. Mobile banking apps may let you check account balances and transfer money from your mobile device. In addition, a user may deposit paper checks from virtually anywhere using their smartphone or tablet. However, users may have to take pictures and have them processed remotely.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
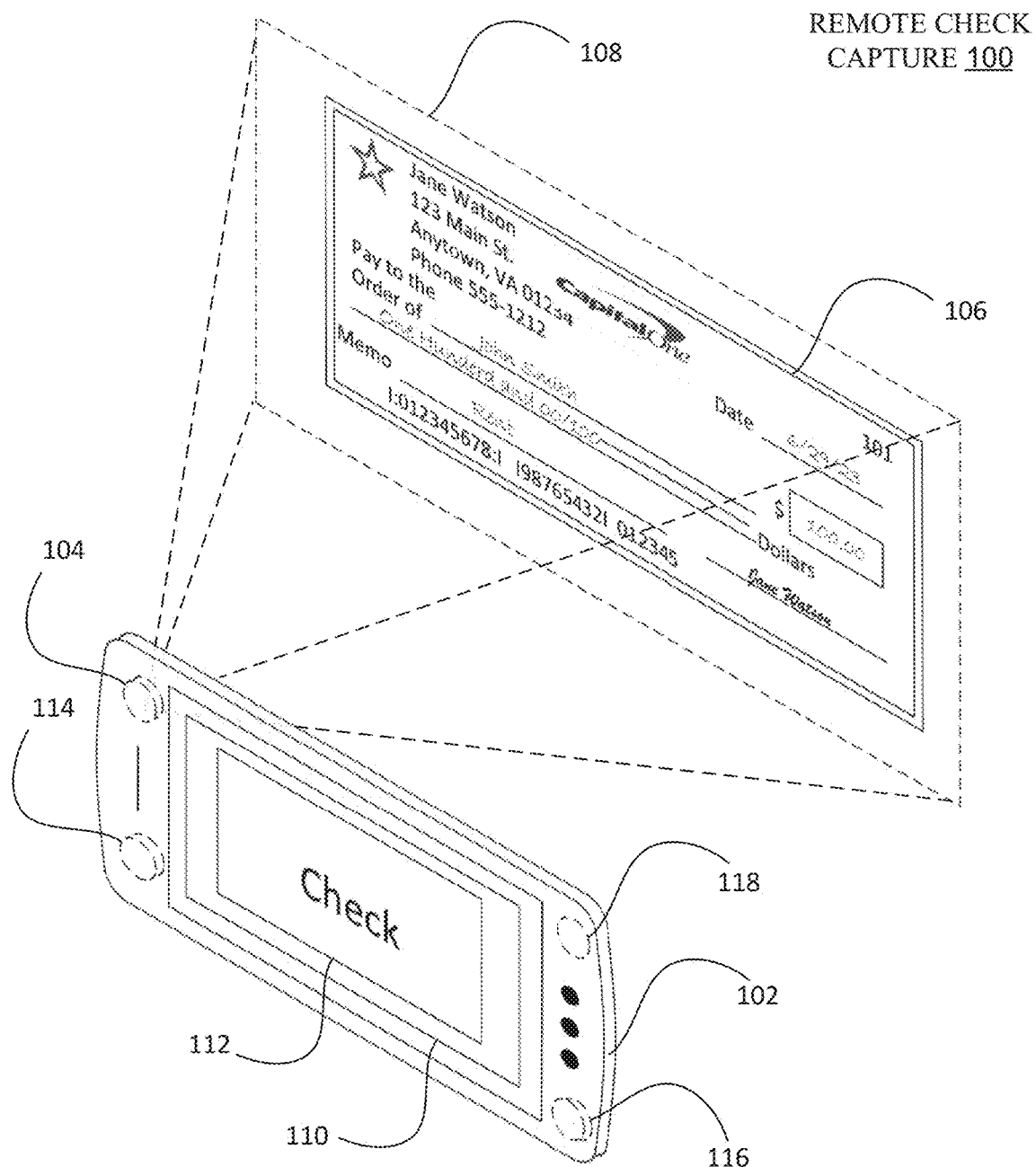
FIG. 1 illustrates an example remote deposit, according to some embodiments and aspects.

Disclosed herein are system, apparatus, device, method, computer program product embodiments, and/or combinations and sub-combinations thereof, for financial instrument capture on a mobile device or desktop computing device with neural network data field extraction implementations.

Mobile check deposit is a convenient way to deposit funds using a customer's mobile device or laptop. As technology and digital money management tools continue to evolve, the process has become safer and easier. Mobile check deposit is a way to deposit a financial instrument, e.g., a paper check, through a banking app using a smartphone, tablet, laptop, etc. In existing systems, mobile deposit may request a customer to capture a plurality of pictures of a check using, for example, their smartphone or tablet camera and upload it through a mobile banking app running on the mobile device. Deposits commonly include personal, business, or government checks.

Many banks and financial institutions use advanced security features to keep an account safe from fraud during the mobile check deposit workflow. For example, security measures may include encryption and device recognition technology. In addition, remote check deposit apps typically capture check deposit information without storing the check images on the customer's mobile device (e.g., smartphone). Mobile check deposit may also eliminate or reduce typical check fraud as a thief of the check may not be allowed to subsequently make use of an already electronically deposited check, whether it has cleared or not and may provide an alert to the banking institution of a second deposit attempt. In addition, fraud controls may include mobile security alerts, such as mobile security notifications or SMS text alerts, which can assist in uncovering or preventing potentially fraudulent activity.

In the various embodiments disclosed herein, characters and numerals may be extracted from a financial document using Optical Character Recognition (OCR) techniques. However, current OCR processes may often include errors or incorrect identifications. When financial documents are processed on an order of millions of units, a 3 percent error, may produce 30,000+ errors. Often, these error rates are not sustainable for efficient document processing and may draw down essential company resources that could be better used elsewhere.

The disclosed technology may be used to process images, or portions of images, of documents during transactions, such as assisting, in real-time or near real-time, a customer to electronically deposit a financial instrument, such as a check. In some embodiments, the images may be processed by a plurality of trained machine learning algorithms, such as OCR neural networks, where a selected OCR neural network may be trained by historical extractions of a specified data field or data field type. In addition, each trained OCR neural network may be further tuned by dynamic weighting of one or more features. Each trained OCR neural network may include the electronic or mechanical conversion of images of typed, handwritten, or printed text into machine-encoded text, whether from a scanned document, a photo of a document, a scene photo, a live stream, a byte array object, a video stream of image data, etc. Using the technology described herein check data fields (e.g., check amount, signature, MICR line, account number, etc.) may be extracted in real-time or near-real-time from a live stream of a imagery, images of the check, or portions of the check (e.g., partial check images). While described in the context of check deposit processing, the disclosed technology may be applied to any other financial instrument or document.

In some embodiments, computer vision algorithms for OCR processing may use large language models (LLM). A large language model is a language model characterized by emergent properties enabled by its large size. As language models, they work by taking an input text and repeatedly predicting the next token or word. They may be built with artificial neural networks, pre-trained using self-supervised learning and semi-supervised learning, typically containing tens of millions to billions of weights. In some aspects, LLM includes Natural Language Processing (NLP). One goal is a computer capable of "understanding" the contents of images, including the contextual nuances of the language within them. The technology can then accurately extract information and insights contained in the images as well as categorize and organize the images or fields within images themselves. LLM and NLP functionality may be implemented on a remote deposit platform to train and improve the previously described neural network OCR models that may be subsequently operative with the mobile device OCR processing.

In some embodiments and aspects disclosed herein, the technology described herein actively processes camera imagery of a financial instrument located within the camera field of view, allowing, for example, the user to simplify the image generation process. In one aspect, live camera imagery is streamed as encoded data configured in byte arrays (e.g., as a byte array output video stream object). This imagery may be processed continuously, or alternatively, the imagery may be stored temporarily within memory of the mobile device, such as, in a frame or video buffer.

In some embodiments and aspects disclosed herein, the OCR process may be implemented with an active OCR process using a mobile device, instead of after submission of imagery to a backend remote deposit system. In some aspects, the technology disclosed herein implements "Active OCR" as further described in U.S. application Ser. No. 18/503,778, entitled "Active OCR," filed Nov. 7, 2023, and incorporated by reference in its entirety. Active OCR includes performing OCR processing using the neural networks described herein on image objects formed from a raw live stream of image data originating from an activated camera on a client device. The image objects may capture portions of a check or an entire image of the check. As a portion of a check image is formed into a byte array, it may be provided to the active OCR system to extract any data fields found within the byte array in real-time or near real-time. In a non-limiting example, if the live streamed image data contains an upper right corner of a check formed in a byte array, the byte array may be processed by the active OCR system to extract the origination date of the check. However, other known and future neural network OCR applications may be substituted without departing from the scope of the technology disclosed herein Various aspects of this disclosure may be implemented using and/or may be part of remote deposit systems shown in FIG. 5. It is noted, however, that this environment is provided solely for illustrative purposes, and is not limiting. Aspects of this disclosure may be implemented using and/or may be part of environments different from and/or in addition to the remote deposit system, as will be appreciated by persons skilled in the relevant art(s) based on the teachings contained herein. For example, the technology described herein can be applied to any type of document. An example of a remote deposit shall now be described.

Technical solutions disclosed herein may improve extraction response times and accuracy of data fields extracted by OCR processing. For example, by OCR processing the various data fields in parallel, using customized neural network models, both speed and quality are improved. In some embodiments, the customized neural network models may be trained for specific data field features or types to overcome challenges commonly encountered for variable text or numerical formats, obfuscations, and handwritten text, to name a few. These customized neural network may improve a confidence of generating a correct OCR extraction. In some embodiments, the technical solutions disclosed may eliminate requiring the customer to capture and communicate individual images, and further to eliminate this process for multiple payments. Thus, the process may be more efficient, require less system and network resources, improve user experience, and may reduce instances of accidental duplicate check presentation. In some embodiments, the technology described herein continuously evaluates a quality of a stream of image data from an activated camera of a mobile device or other customer device. One or more high quality image frames (e.g., entire image of check image), or portions thereof, may be OCR processed to extract data fields locally or, alternatively, in a remote OCR process. The techniques described herein may be applied on a mobile device, or other user device, or on a server at a bank, for example.

FIG. 1 illustrates an example remote check capture 100, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Sample check 106, may be a personal check, paycheck, or government check, to name a few. In some embodiments, a customer will initiate a remote deposit check capture from their mobile computing device (e.g., smartphone) 102, but other digital camera devices (e.g., tablet computer, personal digital assistant (PDA), desktop workstations, laptop or notebook computers, wearable computers, such as, but not limited to, Head Mounted Displays (HMDs), computer goggles, computer glasses, smartwatches, etc., may be substituted without departing from the scope of the technology disclosed herein. For example, when the document to be deposited is a personal check, the customer will select a bank account (e.g., checking or savings) into which the funds specified by the check are to be deposited. Content associated with the document include the funds or monetary amount to be deposited to the customer's account, the issuing bank (e.g., check stock information), the routing number, and the account number. Content associated with the customer's account may include a risk profile associated with the account and the current balance of the account. Options associated with a remote deposit process may include continuing with the deposit process or cancelling the deposit process, thereby cancelling depositing the check amount into the account.

Mobile computing device 102 may communicate with a bank or third party using a communication or network interface (not shown). Communication interface may communicate and interact with any combination of external devices, external networks, external entities, etc. For example, communication interface may allow mobile computing device 102 to communicate with external or remote devices over a communications path, which may be wired and/or wireless (or a combination thereof), and which may include any combination of LANs, WANs, the Internet, etc. Control logic and/or data may be transmitted to and from mobile computing device via a communication path that includes the Internet.

In an example approach, a customer will login to their mobile banking app, select the account they want to deposit a check into, then select, for example, a "deposit check" option that will activate their mobile device's camera 104 (e.g., open a camera port). One skilled in the art would understand that variations of this approach or functionally equivalent alternative approaches may be substituted to initiate a mobile deposit.

In a computing device with a camera, such as a smartphone or tablet, multiple cameras (each of which may have its own image sensor or which may share one or more image sensors) or camera lenses may be implemented to process imagery. For example, a smartphone may implement three cameras, each of which has a lens system and an image sensor. Each image sensor may be the same or the cameras may include different image sensors (e.g., every image sensor is 24 MP; the first camera has a 24 MP image sensor, the second camera has a 24 MP image sensor, and the third camera has a 12 MP image sensor; etc.). In the first camera, a first lens may be dedicated to imaging applications that can benefit from a longer focal length than standard lenses. For example, a telephoto lens generates a narrow field of view and a magnified image. In the second camera, a second lens may be dedicated to imaging applications that can benefit from wide images. For example, a wide lens may include a wider field-of-view to generate imagery with elongated features, while making closer objects appear larger. In the third camera, a third lens may be dedicated to imaging applications that can benefit from an ultra-wide field of view. For example, an ultra-wide lens may generate a field of view that includes a larger portion of an object or objects located within a user's environment. The individual lenses may work separately or in combination to provide a versatile image processing capability for the computing device. While described for three differing cameras or lenses, the number of cameras or lenses may vary, to include duplicate cameras or lenses, without departing from the scope of the technologies disclosed herein. In addition, the focal lengths of the lenses may be varied, the lenses may be grouped in any configuration, and they may be distributed along any surface, for example, a front surface and/or back surface of the computing device.

In one non-limiting example, OCR processes may benefit from image object builds generated by one or more, or a combination of cameras or lenses. For example, multiple cameras or lenses may separately, or in combination, capture specific blocks of imagery for data fields located within a document that is present, at least in part, within the field of view of the cameras. In another example, multiple cameras or lenses may capture more light than a single camera or lens, resulting in better image quality. In another example, individual lenses, or a combination of lenses, may generate depth data for one or more objects located within a field of view of the camera.

Using the camera 104 function on the mobile computing device 102, the customer captures live imagery (e.g., video) from a field of view 108 that includes at least a portion of one side of a check image 112. Typically, the camera's field of view 108 will include at least the perimeter of the check. However, any camera position that generates in-focus video of the various data fields located on a check may be considered. Resolution, distance, alignment, and lighting parameters may require movement of the mobile device until a proper view of a complete check, in-focus, has occurred. In some aspects, camera 104, LIDAR sensor 114, microphone 116, and/or gyroscope sensor 118, may capture image, distance, audio data, and/or angular position to assist, for example, in detecting a check flipping action.

An application running on the mobile computer device may offer suggestions or technical assistance to guide a proper framing of a check within the mobile banking app's graphically displayed field of view window 110, displayed on a User Interface (UI) instantiated by the mobile banking app. A person skilled in the art of remote deposit would be aware of common requirements and limitations and would understand that different approaches may be required based on the environment in which the check viewing occurs. For example, poor lighting or reflections may require specific alternative techniques. As such, any known or future viewing or capture techniques are considered to be within the scope of the technology described herein. Alternatively, the camera can be remote to the mobile computing device 102. In an alternative embodiment, the remote deposit is implemented on a desktop computing device with an accompanying digital camera.

Additional remote deposit sample customer instructions may include, but are not limited to, "Once you've completed filling out the check information and signed the back, it's time to view your check," "For best results, place your check on a flat, dark-background surface to improve clarity," "Make sure all four corners of the check fit within the on-screen frame to avoid any processing holdups," "Select the camera icon in your mobile app to open the camera," "Once you've captured video of the front of the check, flip the check to capture video of the back of the check," "Do you accept the funds availability schedule?," "Swipe the Slide to Deposit button to submit the deposit," "Your deposit request may have gone through, but it's still a good idea to hold on to your check for a few days," "keep the check in a safe, secure place until you see the full amount deposited in your account," and "After the deposit is confirmed, you can safely destroy the check." These instructions are provided as sample instructions or comments but any instructions or comments that guide the customer through a remote deposit session may be included.

Figure 2:
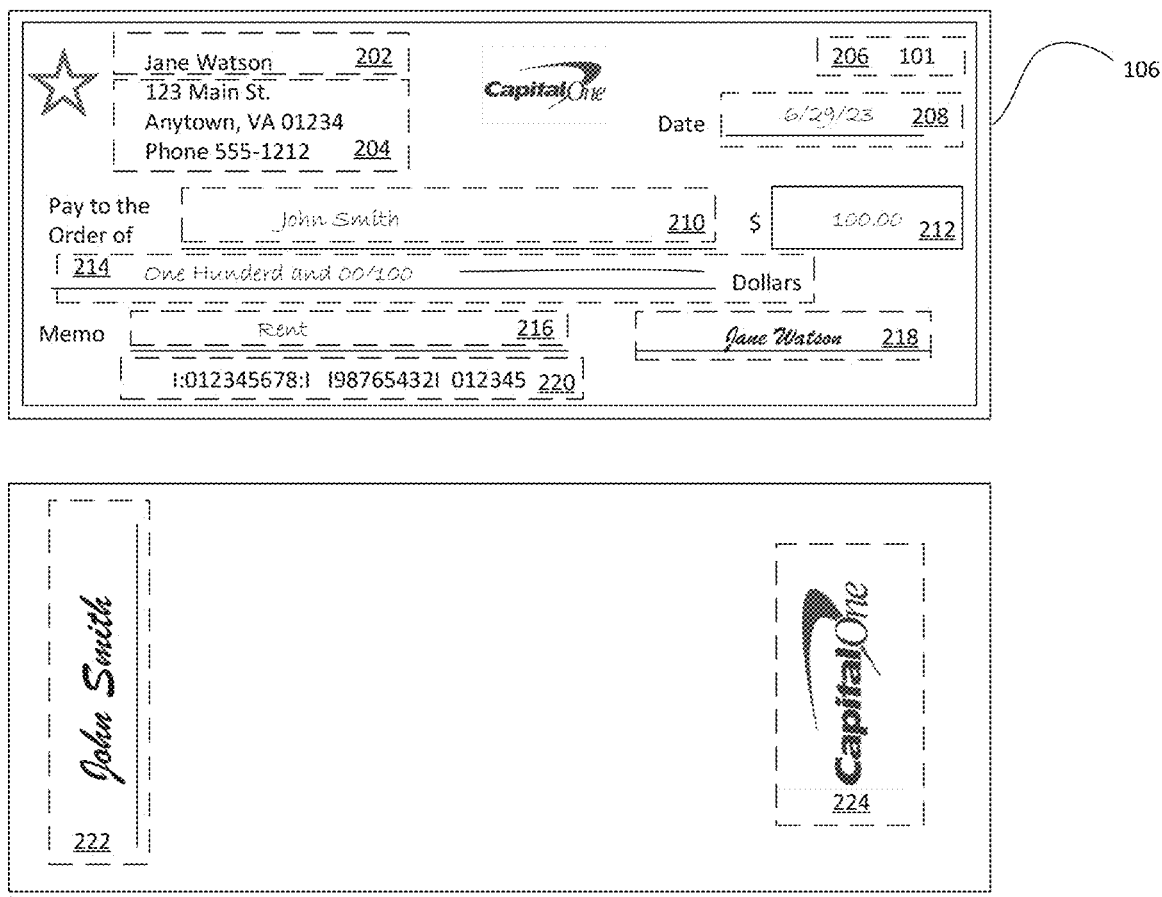
FIG. 2 illustrates example remote deposit Optical Character Recognition (OCR) segmentation, according to some embodiments and aspects.

FIG. 2 illustrates example remote deposit OCR segmentation, according to some embodiments and aspects. Depending on check type, a check may have a fixed number of identifiable fields. For example, a standard personal check may have front-side fields, such as, but not limited to, a payer customer name 202 and address 204, check number 206, date 208, payee field 210, payment amount 212, a written amount 214, memo line 216, Magnetic Ink Character Recognition (MICR) line 220 that includes a string of characters including the bank routing number, the payer customer's account number, and the check number, and finally, the payer customer's signature 218. Back-side identifiable fields may include, but are not limited to, payee signature 222 and security fields 224, such as a watermark.

While a number of fields have been described, it is not intended to limit the technology disclosed herein to these specific fields as a check may have more or less identifiable fields than disclosed herein. In addition, security measures may include alternative approaches discoverable on the front side or back side of the check or discoverable by processing of identified information. For example, the remote deposit feature in the mobile banking app running on the mobile device 102 may determine whether the payment amount 212 and the written amount 214 are the same. Additional processing may be needed to determine a final amount to process the check if the two amounts are inconsistent. In one non-limiting example, the written amount 214 may supersede any amount identified within the amount field 212.

The various virtual server embodiments, described herein for a remote cloud banking system 516, may alternatively be processed locally on the client device, with assistance (e.g., thin client) or without assistance from the cloud banking system 516 (e.g., backend 522). In one embodiment, OCR processing of a live stream of check imagery may include implementing one or more of the virtual server instructions on the customer's mobile device to process each of the field locations on the check as they are detected or systematically (e.g., as an ordered list extracted from a byte array output video stream object). For example, in some aspects, the video streaming check imagery may reflect a pixel scan from left-to-right or from top-to-bottom with data fields identified within a frame of the check as they are streamed.

In one non-limiting example, the customer holds their smartphone over a check (or checks) to be deposited remotely while the live stream of imagery may be formed into image objects, such as, byte array objects (e.g., frames or partial frames), ranked by confidence score (e.g., quality), and top confidence score byte array objects sequentially OCR processed until data from each of required data fields has been extracted as described in U.S. application Ser. No. 18/503,787, entitled Burst Image Capture, filed Nov. 7, 2023, and incorporated by reference in its entirety herein. Alternatively, the imagery may be a blend of pixel data from descending quality image objects to form a higher quality (e.g., high confidence) blended image that may be subsequently OCR processed, as per U.S. patent application Ser. No. 18/503,799 filed Nov. 7, 2023, entitled Intelligent Document Field Extraction from Multiple Image Objects, and incorporated by reference in its entirety herein. In another example, mobile device's camera 104 may capture an image and store it in memory. The techniques described herein can then be applied to the stored image.

In another non-limiting example, fields that include typed information, such as the MICR line 220, check number 206, payer customer name 202 and address 204, etc., may be OCR processed first or in parallel, followed by a more complex or time intensive OCR process of identifying written fields, which may include handwritten fields, such as the payee field 210, signature 218, to name a few. In another non-limiting example, fields that include type information may be processed on the mobile device and more complex or time intensive OCR may be processed on the bank server side.

Alternatively, or in addition to, machine learning platforms may train neural network models to recognize a quality of a frame or partial frame of image data, or an OCR model(s) to recognize characters, numerals or other check data within the data fields of the video streamed imagery. Machine learning may involve computers learning from data provided so that they carry out certain tasks. For more advanced tasks, it can be challenging for a human to manually create the needed algorithms. This may be especially true of teaching approaches to correctly identify patterns. The discipline of machine learning therefore employs various approaches to teach computers to accomplish tasks where no fully satisfactory algorithm is available. In cases where vast numbers of potential answers exist, one approach, supervised learning, is to label some of the correct answers as valid or successful. For example, a high quality image may be correlated with a confidence score based on previously assigned quality ratings of a number of images. This may then be used as training data for the computer to improve the algorithm(s) it uses to determine future successful outcomes. The confidence model and neural network OCR models may be resident on the mobile device and may be integrated with or be separate from a banking application (app). These models may be continuously updated by future images or transactions used to train the model(s).

ML involves computers discovering how they can perform tasks without being explicitly programmed to do so. ML includes, but is not limited to, artificial intelligence, deep learning, fuzzy learning, supervised learning, unsupervised learning, etc. Machine learning algorithms build a model based on sample data, known as "training data," in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine-learning engine may use various classifiers to map concepts associated with a specific process to capture relationships between concepts (e.g., image clarity vs. recognition of specific characters or numerals) and a success history. The classifier (discriminator) is trained to distinguish (recognize) variations. Different variations may be classified to ensure no collapse of the classifier and so that variations can be distinguished.

In some aspects, machine learning models are trained on a remote machine learning platform (not shown) using other customer's transactional information (e.g., previous remote deposit transactions). For example, large training sets of remote deposit imagery may be used to normalize prediction data (e.g., not skewed by a single or few occurrences of a data artifact). Thereafter, a predictive model(s) may classify a specific image against the trained predictive model to predict an imagery check position (e.g., front-facing, flipped, back-facing), detect a check's edges and corners, text, numbers, or generate a confidence score. In one embodiment, the predictive models are continuously updated as new remote deposit financial transaction imagery becomes available.

In some aspects, a ML engine may continuously change weighting of model inputs to increase customer interactions or success with the remote deposit procedures. For example, weighting of specific data fields may be continuously modified in the model to trend towards greater success, where success is recognized by correct data field extractions or by completed remote deposit transactions. Conversely, input data field weighting that lowers successful interactions may be lowered or eliminated.

Figure 3:
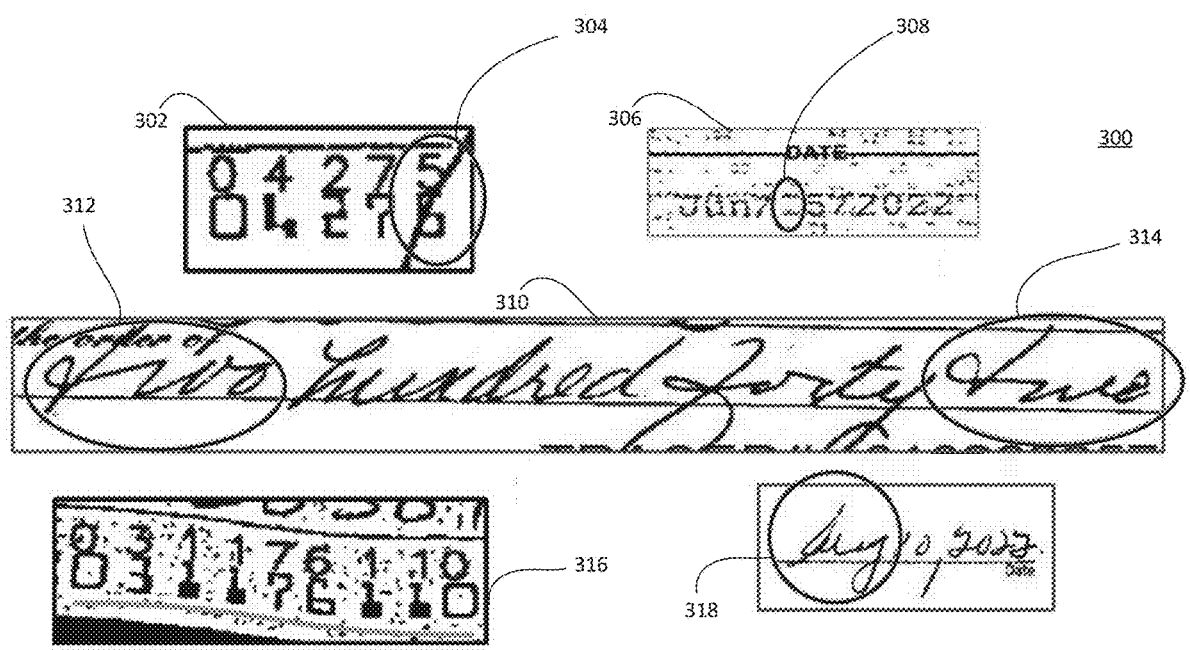
FIG. 3 illustrates an example diagram of various check data fields, according to some embodiments and aspects.

FIG. 3 illustrates an example diagram of various check data fields, according to some aspects. A plurality of common check data fields 300 are illustrated as examples of common obstacles that may arise during OCR processing. In 302, a series of preprinted numbers (e.g., from a MICR) may have handwritten text or portions of text that infiltrate an area set aside for the preprinted text. For example, when writing text that represents a written amount of the check, distal portions of the handwritten letters may overlap the preprinted numbers and potentially compromise the OCR extraction process. As shown in this example 302, handwritten text in area 304 overlaps a number (5 or 6) that results in ambiguity during an OCR extraction process. While an OCR process may extract the number "04275", as shown, a better evaluation of the last digit may be needed to avoid a potential error.

In 306, a printed date may have non-date pixel data captured from toner particles, smudges, food particles, smears, ink particles or previously printed lines that may obfuscate the preprinted numbers. In another example, numbers may not be clearly defined when printed. As shown in this example a number in area 308, has ink particles, a preprinted line and a lightly printed numeral that separately, or collectively, may result in ambiguity during an OCR extraction process. While an OCR process may extract the date Jun. 15, 2022, it may also extract Jun. 25, 2022. Therefore, a better evaluation of the obfuscated digit may be needed to avoid an error.

In 310, a handwritten amount may have preprinted text that competes with the handwritten information in area 312, or portions of text that touch a preprinted line or box in area 314. For example, when writing text that represents a written amount of the check, distal portions of the handwritten letters words may overlap these preprinted areas or other handwritten text and potentially compromise the OCR extraction process. As shown in this example, in 312, handwritten text "two" overlaps a preprinted letter "d" from the word "order" that may result in ambiguity during an OCR extraction process.

In 316, preprinted numerals (e.g., MICR) may be located in areas where the surface of the check is not flat or square to the camera. For example, checks may be wrinkled, bent, folded, torn, missing small pieces, or placed on a non-flat surface during imaging, to name a few physical check characteristics. As shown in this example 314, because the text is perceived as curved by the OCR, processing ambiguity or errors may be made. While an OCR process may extract the numerals "031176110", as shown, it may also extract "031176110". Therefore, a better evaluation of the affected digits may be needed to avoid an error.

In 318, a handwritten date may intersect with preprinted lines. For example, when writing text that represents a date, distal portions of the handwritten letters may overlap these preprinted areas and potentially compromise the OCR extraction process. Alternatively, or in addition to, the handwritten text may have errors simply generated by poor penmanship. For example, a quickly written date may not include accurately portrayed characters or correct punctuation.

While specific data extraction ambiguity examples have been described herein, these examples are not meant to represent an exhaustive list of all possible ambiguities. Therefore, the scope of the technology disclosed herein is not limited to only these examples.

Figure 4:
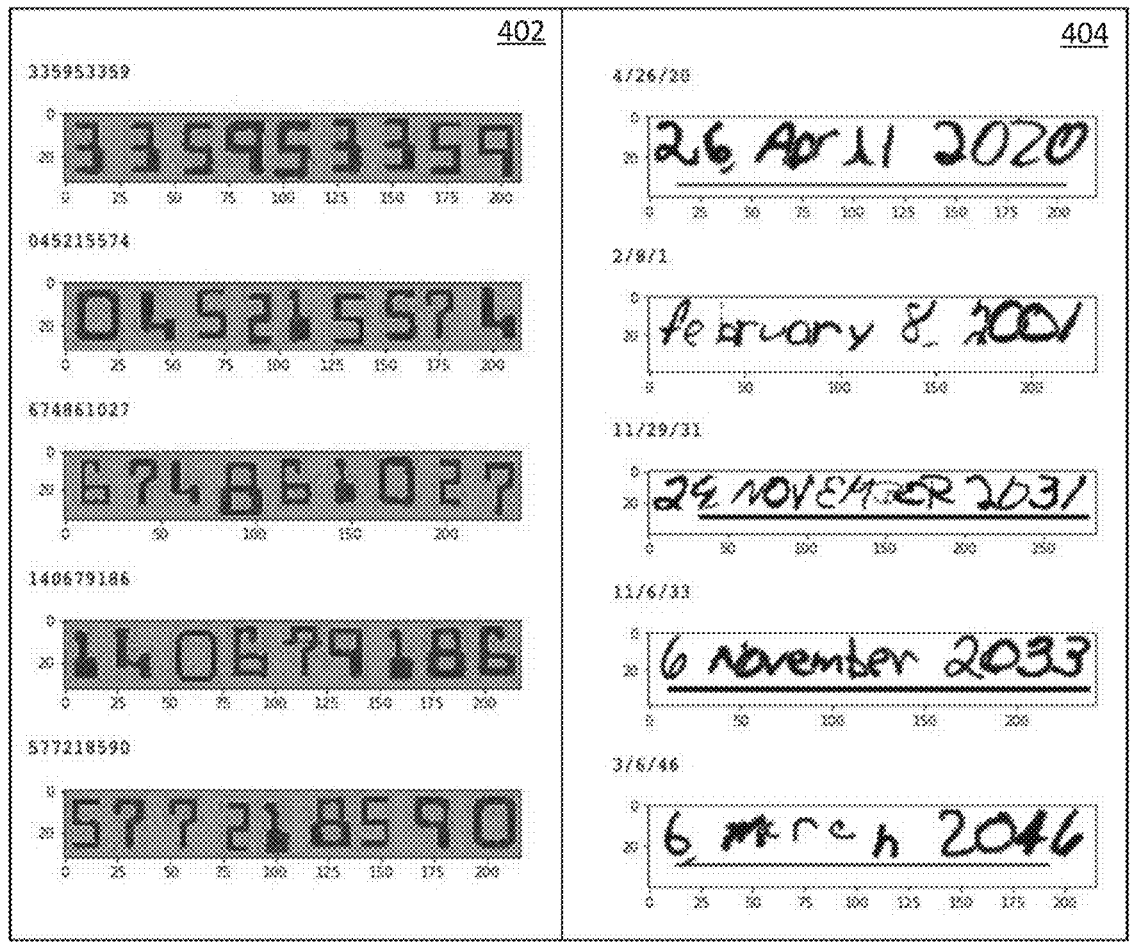
FIG. 4 illustrates another example diagram of various check data fields, according to some embodiments and aspects.

FIG. 4 illustrates an example diagram of various check data fields, according to some aspects. A plurality of common data fields 402 (5 MICR fields) are illustrated as examples of common obstacles that may arise during OCR processing. In 402, a series of preprinted numbers (e.g., from a MICR) may incur OCR errors based on inconsistencies during printing. As shown in these examples, numerals may be printed in varying thicknesses, alignments, spacing, and inconsistent replications, to name a few. While an OCR process may extract the numbers as shown (upper left for each MICR), a better evaluation of the digits may be needed to avoid potential errors.

A plurality of common date fields 404 (5 date formats) are illustrated as examples of common obstacles that may arise during OCR processing. In 404, a series of dates are written in five differing date formats and may include appropriate or inappropriate punctuation or printed line interactions. While an OCR process may extract the dates as shown (upper left for each date), a better evaluation of the digits and formats may be needed to avoid potential errors.

As with the examples described in FIG. 3, specific data extraction ambiguity examples have been described herein. However, they are not meant to represent an exhaustive list of possible ambiguities. The scope of the technology disclosed herein is not limited to only these examples.

Figure 5:
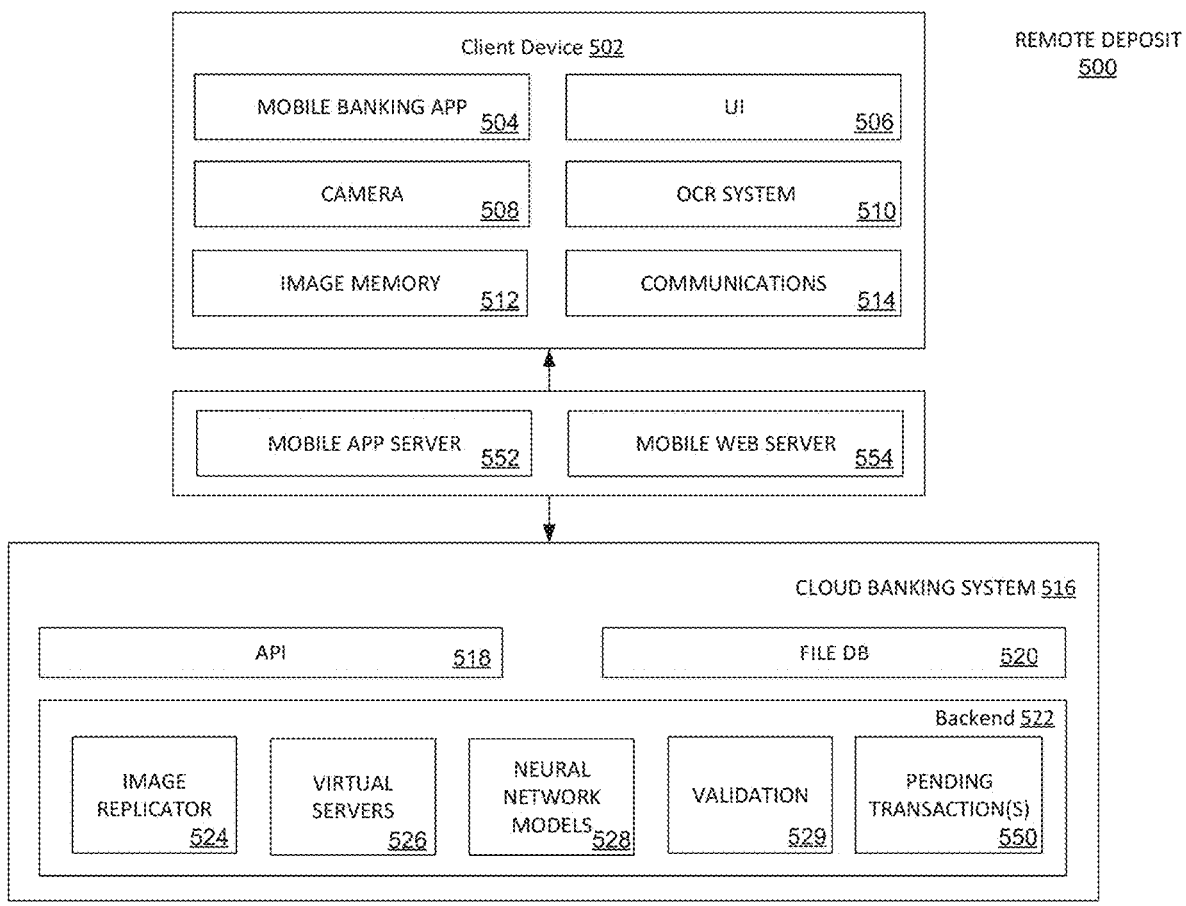
FIG. 5 illustrates a block diagram of a remote deposit system architecture, according to some embodiments and aspects.

FIG. 5 illustrates a remote deposit system architecture 500, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

As described throughout, a client device 502 (e.g., mobile computing device 102) implements remote deposit processing for one or more financial instruments, such as checks. The client device 502 is configured to communicate with a cloud banking system 516 to complete various phases of a remote deposit as will be discussed in greater detail hereafter.

In aspects, the cloud banking system 516 may be implemented as one or more servers. Cloud banking system 516 may be implemented as a variety of centralized or decentralized computing devices. For example, cloud banking system 516 may be a mobile device, a laptop computer, a desktop computer, grid-computing resources, a virtualized computing resource, cloud computing resources, peer-to-peer distributed computing devices, a server farm, or a combination thereof. Cloud banking system 516 may be centralized in a single device, distributed across multiple devices within a cloud network, distributed across different geographic locations, or embedded within a network. Cloud banking system 516 can communicate with other devices, such as a client device 502. Components of cloud banking system 516, such as Application Programming Interface (API) 518, file database (DB) 520, as well as backend 522, may be implemented within the same device (such as when a cloud banking system 516 is implemented as a single device) or as separate devices (e.g., when cloud banking system 516 is implemented as a distributed system with components connected via a network).

Mobile banking app 504 is a computer program or software application designed to run on a mobile device such as a phone, tablet, or watch. However, in a desktop application implementation, a mobile banking app equivalent may be configured to run on desktop computers, and web applications, which run in web browsers rather than directly on a mobile device. Apps are broadly classified into three types: native apps, hybrid and web apps. Native applications are designed specifically for a mobile operating system, such as, iOS or Android. Web apps are designed to be accessed through a browser. Hybrid apps may function like web apps disguised in a native container.

Financial instrument imagery may originate from, but is not limited to, image streams (e.g., series of pixels or frames). A customer using a client device 502, operating a mobile banking app 504 through an interactive User Interface (UI) 506, frames at least a portion of a check (e.g., identifiable fields on front or back of check) with a camera 508 (e.g., camera's field of view).

In one aspect, the camera imagery is live streamed as encoded text, such as a byte array. Alternatively, or in addition to, the imagery may be buffered by storing (e.g., at least temporarily) as images or frames in computer memory. For example, live streamed check imagery from camera 508 may be stored locally in image memory 512, such as, but not limited to, a frame buffer, a video buffer, a video streaming buffer, or a virtual buffer. In yet another aspect, an image is simply captured using camera 508. In a first non-limiting example, by first detecting pixels in a video stream, or an image byte array, which contain typed or written image components, with, for example, darker, higher contrast, and common black or blue color values, a confidence score may be calculated based on an overall perceived individual image quality. In some aspects, the confidence score may be predicted by a ML model trained on previous images, assigned confidence scores, and corresponding quality ratings. Alternatively, or in addition to, in one aspect, a total pixel score for each image may be calculated. For example, in some aspects, only pixels in a range of pixel values (e.g., range of known marking pixel values, such as 0-50) may be processed, without processing the remaining pixels. For example, those pixels that only include a high pixel value (e.g., lighter pixel grey values), such as, in a background section of the check may not be included in a generated confidence score. In some aspects, pixels that capture pre-printed border pixels also may not be considered in the confidence score. In this aspect, the Machine Learning (ML) models may be trained to recognize the values that represent the written or typed information as well as the preprinted borders. For example, using machine learning, thousands or millions of images may be processed to learn to accurately recognize and categorize these pixels. While described for quality scored imagery, OCR processing may be performed without scoring without departing from the scope of the technology described herein.

In some embodiments, OCR system 510 (e.g., active OCR), resident on the client device 502, or alternatively on the backend 522, processes the highest confidence images based on live streamed check imagery from camera 508 to extract data by identifying specific data located within known sections of the check to be electronically deposited. In one non-limiting example, single identifiable fields, such as the payer customer name 202, MICR data field 220 identifying customer and bank information (e.g., bank name, bank routing number, customer account number, and check number), date field 208, check amount 212 and written amount 214, and authentication (e.g., payee signature 222) and security fields 224 (e.g., watermark), etc., shown in FIG. 2, are processed by the OCR system 510.

OCR system 510 communicates data extracted from the one or more data fields during the OCR operation to cloud banking system 516, shown in FIG. 5. For example, the extracted data identified within these fields is communicated to file database (DB) 520 either through a mobile app server 552, mobile web server 554 depending on the configuration of the client device (e.g., mobile or desktop). Alternatively, or in addition to, the OCR processing of the imagery to extract data fields is implemented on the cloud banking system (e.g., in backend 522). In one aspect, the extracted data identified within these fields is communicated through the mobile banking app 504.

Alternatively, or in addition to, a thin client (not shown) resident on the client device 502 processes extracted fields locally with assistance from cloud banking system 516. For example, a processor (e.g., CPU) implements at least a portion of remote deposit functionality using resources stored on a remote server instead of a localized memory. The thin client connects remotely to the server-based computing environment (e.g., cloud banking system 516) where applications, sensitive data, and memory may be stored.

In one embodiment, imagery with a highest confidence score is processed from live streamed check imagery from camera 508, as communicated from an activated camera over a period of time, until an OCR operation has been completed. For example, a highest confidence scored image in a plurality of images, or partial images, is processed by OCR system 510 to identify as many data fields as possible. Subsequently, the next highest confidence scored image is processed by OCR system 510 to extract any data fields missing from the first image OCR and so on until all data fields from the check have been captured. Alternatively, or in addition to, specific required data fields (e.g., amount, MICR, etc.) may be identified first in a first OCR of a highest confidence scored image or partial image, followed by subsequent data fields (e.g., signature) in lower confidence scored mages.

Backend 522, may include one or more system servers processing banking deposit operations in a secure environment. These one or more system servers operate to support client device 502. API 518 is an intermediary software interface between mobile banking app 504, installed on client device 502, and one or more server systems, such as, but not limited to the backend 522, as well as third party servers (not shown). The API 518 is available to be called by mobile clients through a server, such as a mobile edge server (not shown), within cloud banking system 516. File DB stores data received from the client device 502 or generated as a result of processing a remote deposit.

Figure 6:
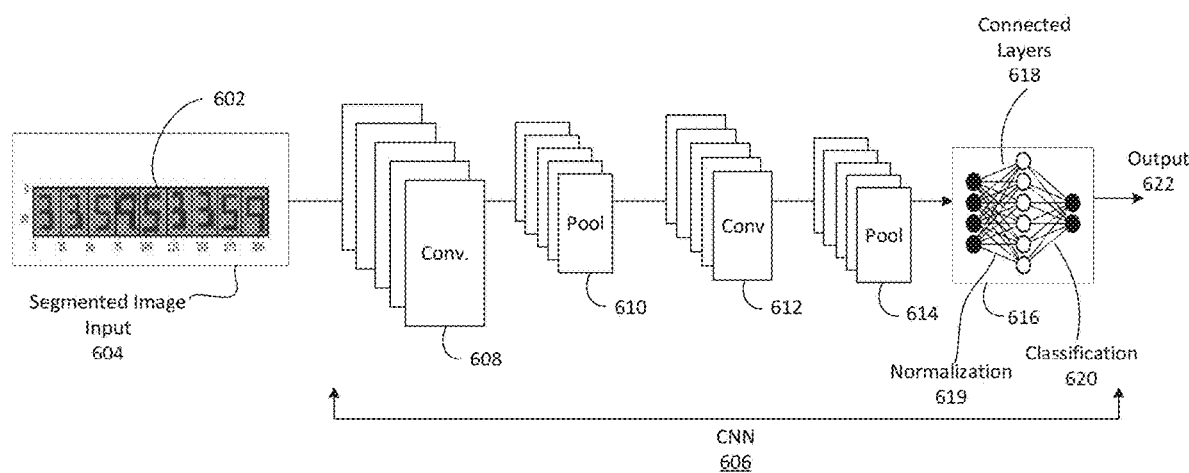
FIG. 6 illustrates a block diagram of a data field extraction implemented with a trained customized neural network model, according to some embodiments and aspects.
Figure 7:
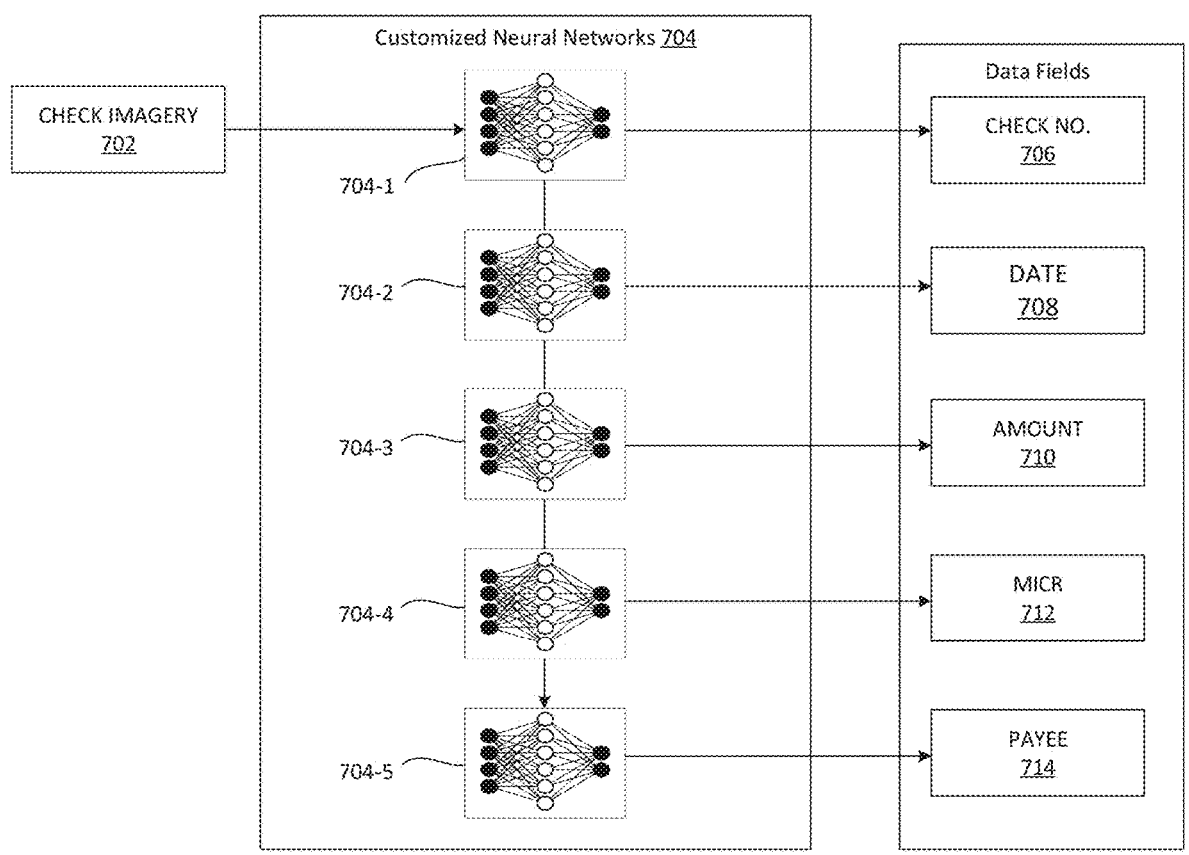
FIG. 7 illustrates a block diagram of a serial customized neural network data field extraction, according to some embodiments and aspects.
Figure 8:
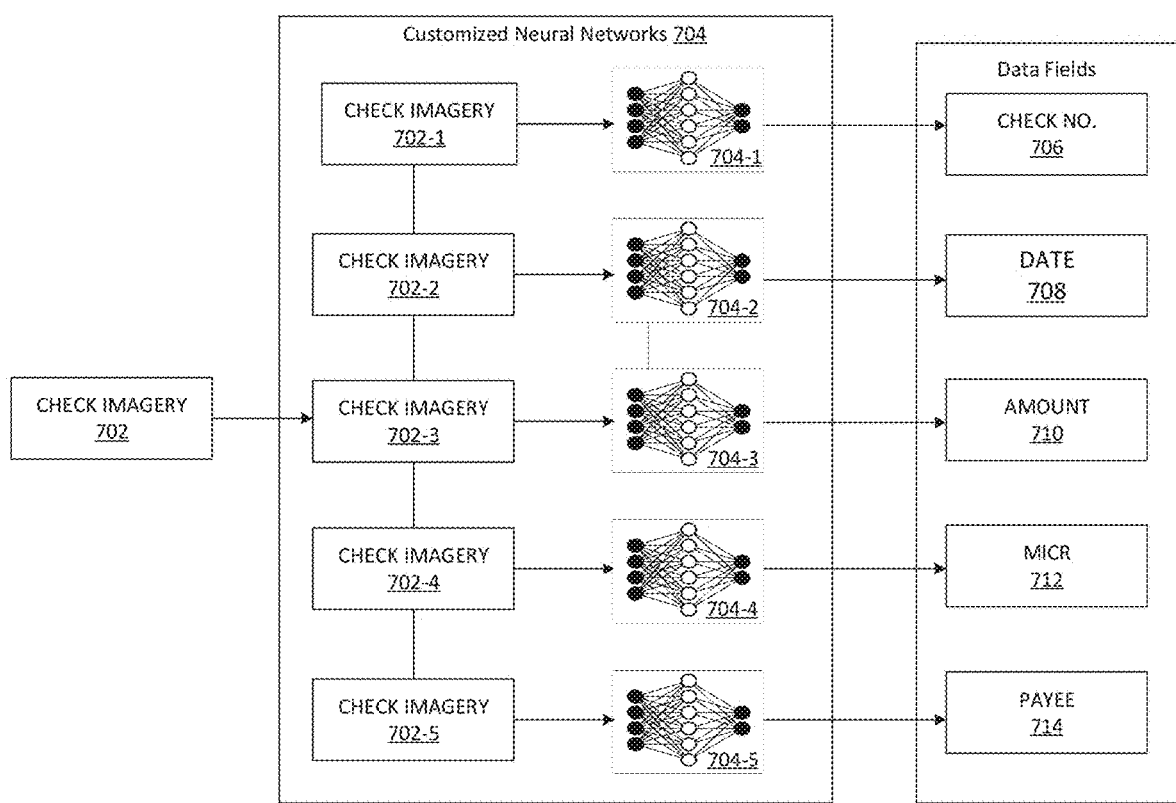
FIG. 8 illustrates a block diagram of a parallel customized neural network data field extraction, according to some embodiments and aspects.

As described in greater detail in FIGS. 6-8, neural network models 528 (e.g., customized neural network models), are trained and tuned for extraction of a specific data field or data field type and may be selected and implemented based on at least a portion of a current check being processed, at least in part, by a remote deposit process. In some aspects, the check imagery is replicated 524 before OCR processing. For example, a plurality of check images may be replicated in an embodiment (see FIG. 8) where the data fields are extracted in parallel with selected neural network models 528. In one aspect, the check imagery may be replicated and distributed to a plurality of virtual servers 526 to individually process the extraction of specific data fields. Validation module 529 generates a set of validations including, but not limited to, any of: mobile deposit eligibility, account, image, transaction limits, duplicate checks, amount mismatch, MICR, multiple deposit, recurring transaction eligibility, etc. While shown as a single module, the various validations may be performed by, or in conjunction with, the client device 502, cloud banking system 516, or third party systems or data.

When remote deposit data fields have been extracted and the validations performed, the check will be stored as a pending transaction(s) 550 until funding has been completed.

When a remote deposit transaction status information is generated, it is passed back to the client device 502 through API 518 where it is formatted for communication and display on the client device 502 and may, for example, communicate a funding schedule for display or rendering on the customer's device through the mobile banking app UI 506. The UI may instantiate the funding schedule as images, graphics, audio, additional content, etc. Alternatively, or in addition to, status messaging may be automated and directed to the payor's banking app as a notification. Alternatively, or in addition to, the status message may be an automated call or text message to the payor's telephone number.

Alternatively, or in addition to, one or more components of the remote deposit process may be implemented within the client device 502, third party platforms, the cloud-based banking system 516, or distributed across multiple computer-based systems. The UI may instantiate the remote deposit status as images, graphics, audio, additional content, etc. In one technical improvement over current processing systems, the remote deposit status is provided mid-video stream, prior to completion of the deposit. In this approach, the customer may terminate the process prior to completion if they are dissatisfied with the remote deposit processes.

While not shown, backend 522 may also include a server processing Customer Accounts that include, but are not limited to, a customer's banking information, such as individual, joint, or commercial account information, balances, loans, credit cards, account historical data, etc. Also, a server processing Customer Profiles may retrieve customer profiles associated with the customer from a registry (or other database) after extracting customer data from front or back imagery of the financial instrument. Customer profiles may be used to determine, deposit limits, historical activity, security data, contact information, or other customer related data.

In one aspect embodiment, remote deposit system 500 tracks customer behavior. For example, did the payee accept a transaction or did they deny the request? In some aspects, the completion of the transaction operation reflects a successful outcome, while a denial or cancellation reflects a failed outcome. In some aspects, this customer behavior, not limited to success/failure, may be fed back to a ML platform (not shown) to enhance future training of any of ML models. For example, in some embodiments, one or more inputs to the ML models may be weighted differently (higher or lower) to effect a predicted higher successful outcome. In one non-limiting example, the extracted data can be displayed on a user interface of the mobile device; the user is provided an opportunity to confirm the data, which can then be used as an input to the ML model.

FIG. 6 illustrates a block diagram 600 of a data field extraction implemented with a trained convolutional neural network (CNN) model, according to some embodiments and aspects. The CNN described herein is a non-limiting example of a customizable neural network. Other customizable neural networks are envisioned within the scope of the technology disclosed herein. The CNN process may include one or more system servers processing banking deposit operations in a secure closed loop. In some aspects, the process may include one or more virtual servers processing banking deposit operations in a secure closed loop. While described for a remote server environment, mobile computing device and desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art.

In one embodiment, mobile banking app 502 is opened on the client device 502 and the deposit check function selected to initiate a remote deposit process. A camera 508 is activated to initiate a live stream of imagery from a field of view of the camera 508. The camera may output one or more images or portions of images (e.g., images of real-world objects) that are viewable by camera 508. As shown, an image portion of a check may include a series of preprinted numerals 602 (e.g., MICR) that are selected by the OCR system 510 (locally or on the backend 522) for data extraction. In one aspect, the individual numerals are segmented using computer vision programs to delineate each as a separate numeral. This segmented image 604, in some embodiments, is OCR processed by a trained customized neural network model (e.g., CNN) to extract the numerals in the MICR sequence, for example, where the network model may be specifically trained by historical or synthetically generated images or byte arrays that include at least a MICR portion. In some embodiments, each customized neural network model, as described further below, may include a different architecture, architecture variation (e.g., modified version) or combination of architectures, to process the specific features (e.g., parameters) common to a specific data field (e.g., cursive handwritten text, printed text, formats (e.g., date formats), numerals, inks (e.g., magnetic ink), etc.)

Artificial neural networks are used for predictive modeling, adaptive control, and other applications where they can be trained via a dataset. Networks can learn from experience, and can derive conclusions from a complex and seemingly unrelated set of information. Convolutional neural network (CNN) 606 may be implemented to extract data fields, or portions of data fields, in an OCR extraction process. A CNN is a regularized type of feed-forward neural network that learns feature engineering by itself via filters (or kernel) optimization. Higher-layer features are extracted from wider context windows, compared to lower-layer features.

A CNN 606 may include an input layer, hidden layers and an output layer. In a CNN, the hidden layers include one or more layers that perform convolutions (608 and 612). Typically this includes a layer that performs a dot product of the convolution kernel with the layer's input matrix. As the convolution kernel slides along the input matrix for the layer, the convolution operation generates a feature map, which in turn contributes to the input of the next layer. This is followed by other layers such as pooling layers (610 and 614), connected layers 618 (e.g., fully connected), and normalization layer(s) 619 or classification layer(s) 620. Convolutional layers (608 and 612) convolve the input and pass its result to the next layer until an output 622 generates the extracted data point or data field (e.g., numeral(s)). Normalization is a pre-processing technique used to standardize data. In other words, having different sources of data inside the same range. Classification is the task of assigning a label or class to an image. In a supervised learning problem, a CNN model may be trained on a labeled dataset of images and their corresponding class labels, and it is then used to predict the class label of new, unseen images.

In some aspects, during the training phase, neural networks learn from labeled training data by iteratively updating their parameters to minimize a defined loss function. This method allows the network to generalize to unseen data. Each neuron in a neural network computes an output value by applying a specific function to the input values received from the receptive field in the previous layer. The function that is applied to the input values is determined by a vector of weights and a bias (typically real numbers). Learning consists of iteratively adjusting these biases and weights.

The vectors of weights and biases are called filters and represent particular features of the input (e.g., a particular letter or numeral shape). A distinguishing feature of CNNs is that many neurons can share the same filter. This reduces the memory footprint because a single bias and a single vector of weights are used across all receptive fields that share that filter, as opposed to each receptive field having its own bias and vector weighting.

When the OCR data field extraction process is performed (e.g., in File DB 520), the extracted data fields may be stored in cloud banking system 516. When performed on the client device 502, the extracted data fields may be continuously transmitted, periodically transmitted, or be transmitted after completion of the OCR process (e.g., after all data fields are extracted), as check data fields to cloud banking system 516 via a network connection.

In a non-limiting example, a customizable neural network model may be a categorical CNN, where each value is a category or classification. In another non-limiting example, a customizable neural network model may be a region-based CNN, where each value is derived by dividing the input image into multiple regions or sub-regions. In non-limiting examples, customizable neural network architectures may include, but are not limited to, ResNet, TrOCR, LeNet, AlexNet, VGG, GoogLeNet, and combinations or variations thereof. Architectures may differ based on any of: a number of filters, pooling stages, arrangements, connections, blocks, layers, image channels, weightings, or number of classes, etc.

ResNet, or Residential Network architecture, may use CNN blocks multiple times, so as to create a class for CNN block, which takes input channels and output channels. The ResNet class may take an input of a number of blocks, layers, image channels, and a number of classes.

TrOCR, or transformer architecture OCR, is a transformer-based encoder-decoder model, which is convolution free as it first resizes the input text image into a sequence of patches as the input to image Transformers. TrOCR may lend itself to synthetic training data (training data created by a user or computer).

LeNet may be used for handwritten method digit recognition. LeNet-5 may include 2 convolutional and 3 full layers.

AlexNet is a deep CNN architecture designed for image classification tasks by leveraging convolutional layers to learn features from images hierarchically. VGG (Visual Geometry Group) is a deep CNN design with a plurality of layers.

GoogLeNet, or GoogleNet, architecture may include multiple stacked inception modules, each followed by average pooling and fully connected layers. The architecture allows for efficient computation by leveraging the benefits of parallel convolutions and dimensionality reduction.

This set of example neural network architectures represents a subset of all possible architectures that may be implemented with the technology disclosed herein, and therefore is not meant to be exhaustive.

In one aspect, imagery of a first side is processed, followed by a flip of the financial document and then processing of second side imagery. Alternatively, or in combination, the first side and second side imagery is processed together or in parallel using imagery or byte array objects formed before and after the flip action.

FIG. 7 illustrates a block diagram 700 of a data field extraction implemented with a plurality of trained customizable neural network models, according to some embodiments and aspects. The customizable neural network process may include one or more system servers processing banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 7, as will be understood by a person of ordinary skill in the art. Training data as described herein may refer to historical images and corresponding results (e.g., labels), be generated synthetically, or a combination of both.

Check imagery 702, such as an image of a check, a portion of check or a byte array is fed to a series of specifically trained, weighted, and tuned customizable neural networks 704 for neural network OCR data field extractions. In one example embodiment, the check imagery includes a plurality of data fields 706 (check number), 708 (date), 710 (amount), 712 (MICR), and 714 (payee). This set of data fields represents a subset of all possible data fields that may be extracted and is illustrated as a smaller set for simplicity purposes, and therefore is not meant to be exhaustive.

As previously described, customizable neural network 704-1 may be of a selected architecture and be trained on historical imagery and data extractions for check numbers 706 found on previously processed check imagery. For example, thousands or millions of check images that included a check number data field that was successfully (e.g., accurately) extracted by previous OCR processes are used to train customizable neural network 704-1. For example, in a supervisory approach, each image of a check number is labelled with its corresponding check number. In addition, the model is continuously or periodically trained when new imagery becomes available. In one non-limiting example, a feedback loop with the customer may be established to validate data from the OCR process.

As shown, customizable neural network 704-2 may also be of a selected architecture and be trained on historical imagery and date extractions for dates 708 from previously processed check imagery. For example, thousands or millions of check images that included a date data field that was successfully extracted by previous OCR processes are used to train customizable neural network 704-2. For example, in a deep learning approach each image of a date is processed to recognize a plurality of date formats (e.g., as shown in FIG. 4, 404), numeral shapes and printing inconsistencies. In addition, the model is continuously or periodically trained when new imagery becomes available.

As shown, customizable neural network 704-3 may be of a selected architecture and be trained on historical imagery and amount extractions for handwritten amounts 710 found on previously processed check imagery. For example, thousands or millions of check images that included an amount data field that was successfully extracted by previous OCR processes are used to train customizable neural network 704-3. For example, in a deep learning approach each image of an amount may be processed to recognize a plurality of handwriting styles, letter shapes, and formats (e.g., with or without punctuation). In addition, the model is continuously or periodically trained when new imagery becomes available.

As shown, customizable neural network 704-4 may be of a selected architecture and be trained on historical imagery and MICR extractions for MICR numeric sequences 712 found on previously processed check imagery. For example, thousands or millions of check images that included a MICR data field that was successfully extracted by previous OCR processes are used to train customizable neural network 704-4. For example, in a deep learning approach each image of a MICR is processed to recognize a plurality of printing formats (e.g., as shown in FIG. 4, 402), obfuscations, quality levels, etc. In addition, the model is continuously or periodically trained when new imagery becomes available.

In some aspects, customizable neural network 704-5 is implemented with a data type approach, where the customizable neural network uses a common architecture and previous training results from another data field's training process, where that data field may include data of a similar type. For example, the written amount and the payee data fields may, in some aspects, be considered similar data types, as they both include handwritten data elements. In this aspect, a same customizable neural network model architecture may be implemented for data fields with similar data types. In one aspect, the same customizable neural network model architecture may be separately trained with data specific imagery and may also be tuned for features found, for example, in the payee data field. In addition, the model is continuously or periodically trained when new imagery becomes available.

While described for specific data fields and training approaches, any data field located on a surface of the check (e.g., front and back), including watermarks or hidden data fields (e.g., invisible inks), may be processed by any of the customizable neural network OCR data field extraction processes described herein, by a combination of two or more of these customizable neural networks, to include, but not limited to, customizable neural networks selected for OCR data field extractions based on common data types.

FIG. 8 illustrates a block diagram 800 of data field extractions implemented with a parallel configuration of a plurality of trained customizable neural network models, according to some embodiments and aspects. The customizable neural network process may include one or more system servers processing banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 8, as will be understood by a person of ordinary skill in the art.

Check imagery 702, such as an image of a check, a portion of check or a byte array may be replicated by image replicator 524 (FIG. 5) to generate a plurality of copies 702 (1-5) of the check imagery for neural network OCR data field extractions implemented in a parallel configuration of specifically trained and tuned customizable neural networks 704 (1-5). In one embodiment, the check imagery includes a plurality of data fields 706 (check number), 708 (date), 710 (amount), 712 (MICR), and 714 (payee). This set of data fields represents a subset of all possible data fields that may be extracted and is illustrated as a smaller set for simplicity purposes, and therefore is not meant to be exhaustive. The pairing of customizable neural networks 704 specifically trained to extract specific data fields in parallel provides a technical solution to current OCR processes that produce significant error rates that waste systems and banking resources.

Figure 9:
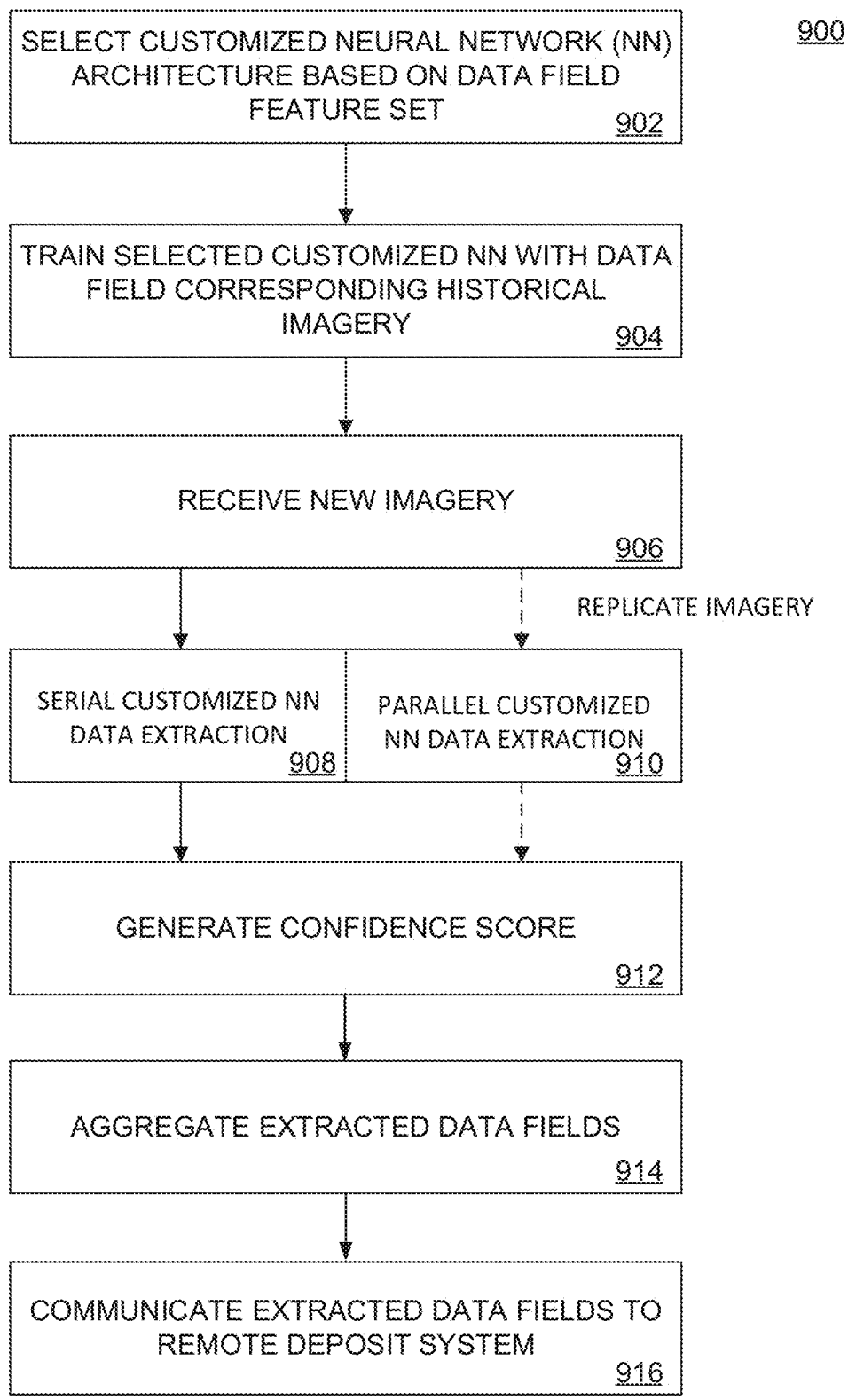
FIG. 9 illustrates an example flow diagram for a data extraction system, according to some embodiments and aspects.

FIG. 9 is a flow chart of an OCR data extraction process 900 for a remote check deposit that can be carried out in line with the discussion above. One or more of the operations in the method depicted by FIG. 9 may be carried out by one or more entities, including, without limitation, mobile computing device 102, client device 502, cloud banking system 516, backend 522, or other server or cloud-based server processing systems and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations. In some aspects, the systems described generate and instantiate an active OCR process for a ranked sequence of confidence scored images in a remote deposit environment.

In 902, a customizable neural network of a specific architecture is selected by the OCR system 510 based on one or more features of a data field to be extracted. This selection provides instructions to the system to pair the selected customizable neural network with a data field for future extractions. The architecture may also be selected based on a similarity to another data field (e.g., two data fields each contain handwritten text), be a modified version of another selected architecture with one or more similar data field parameters, or be a combination of one or more portions of two architectures.

In 904, a selected customizable neural network may be trained by imagery related to the corresponding data field of data field type. Using deep learning, thousands or millions of images may be processed to learn to recognize a check type, common data fields, numerals, letters, punctuation, obfuscations, and locations of data fields relative to a border or side of a check. The selected customizable neural network may be trained by historical or synthetically generated images or byte arrays that include at least imagery of the selected data field portion.

In 906, new imagery is received by the OCR system to extract one or more data fields. The new imagery may be received as an image, portion of an image, video, or a live image video stream, for example, pixels 1, 2, 3 . . . . X converted to byte array objects. In one aspect, the live image stream may be continuously formed into byte array objects until an OCR process has extracted selected data fields from one or both sides of a check. Alternatively, or in addition to, segments or blocks within known data field areas on the check may be processed to determine an initial check orientation and determine a side facing the camera of the client device 502. For example, if a check number data field is initially recognized (e.g., using computer vision processes), it may be determined that the front side of the check is facing up, where recognition of a security watermark or signature line may be indicative of a back-side facing.

In 908, a plurality of the selected customizable neural network models process the first and/or second side imagery serially to extract a target one or more data fields (e.g., for an EFT transaction). Alternatively, in 910, the received imagery is replicated and a plurality of the selected customizable neural network models process the first and/or second side imagery in parallel to extract a target one or more data fields.

In 912, a confidence score is generated to predict a confidence that a correct letter, numeral, punctuation, or data field has been extracted. For example, a classification by the customizable neural network (see FIG. 6) meeting a threshold (e.g., 95%) would produce a high confidence score.

In 914, the extracted data fields and confidence score are aggregated for the received imagery, or portion thereof.

In 916, in some aspects, the extracted data fields and confidence score are communicated locally or remotely to a remote deposit system.

This approach provides a technical solution to effectively extract data fields from check imagery for a remote deposit transaction. For example, a user may move the client device around freely as the camera generates images, portions of images, video, or a live image stream of potentially good (in-focus, good lighting, low shading, etc.) and bad quality imagery (e.g., shadows, glare, or off-center) and still generate quality real-time extractions of check data fields. In addition, the customizable neural networks for individual data fields, or data field types, generates fewer errors than a one-size-fits-all OCR approach, providing higher accuracy, greater speed, thus allowing an efficiency of allocating limited client device resources.

The various aspects solve at least the technical problems associated with performing OCR operations pre-deposit. The various embodiments and aspects described by the technology disclosed herein are able to provide accurate OCR operations mid-experience, before the customer completes the deposit and without requiring the customer to provide additional new image captures post image quality or OCR failures.

Example Computer System

Figure 10:
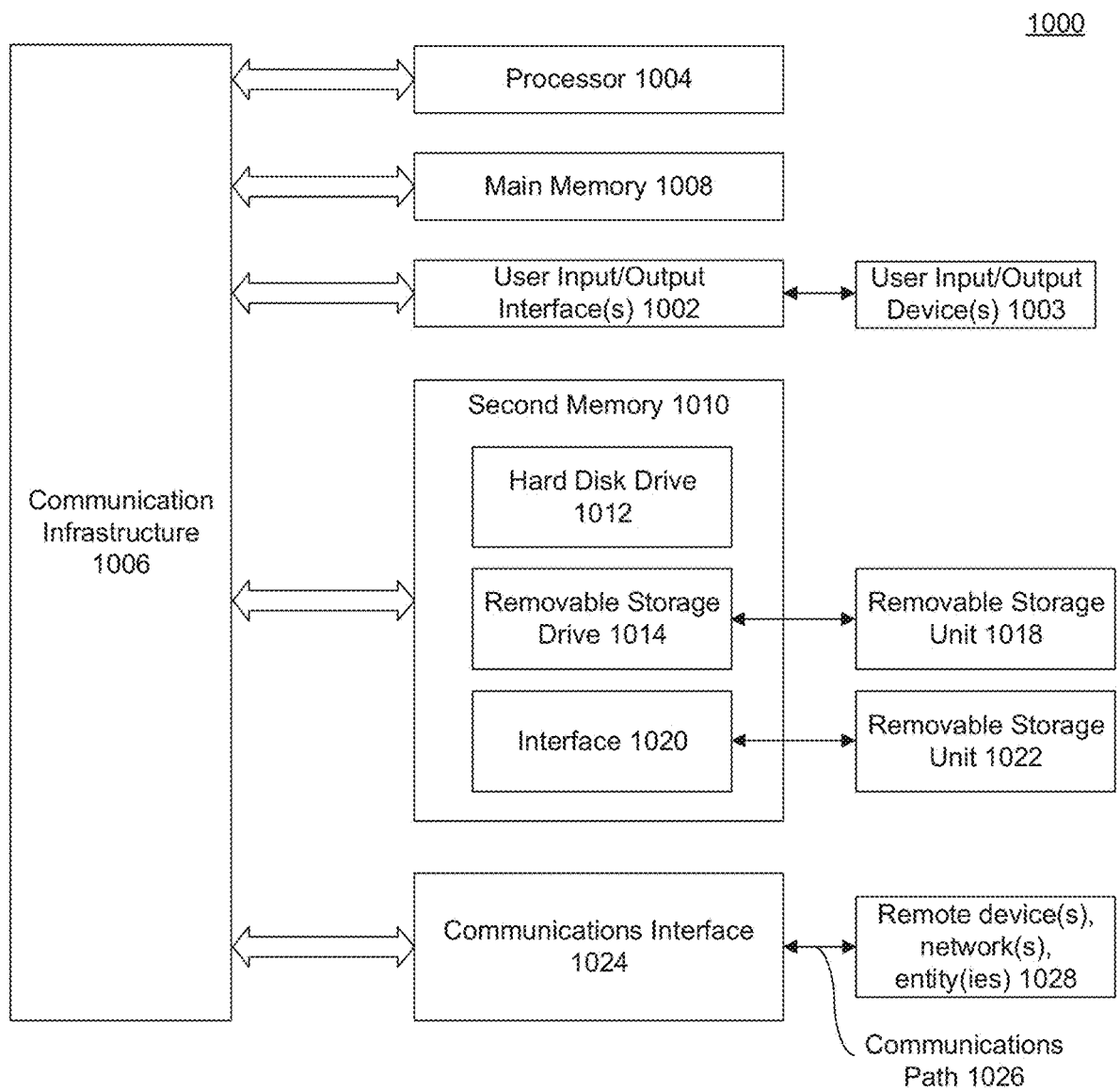
FIG. 10 illustrates an example computer system useful for implementing various embodiments and aspects.

FIG. 10 depicts an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof. For example, the example computer system may be implemented as part of mobile computing device 102, client device 502, cloud banking system 516, etc. Cloud implementations may include one or more of the example computer systems operating locally or distributed across one or more server sites.

Computer system 1000 may include one or more processors (also called central processing units, or CPUs), such as a processor 1004. Processor 1004 may be connected to a communication infrastructure or bus 1006.

Computer system 1000 may also include user input/output device(s) 1002, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1018 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1016 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method, the method comprising:
   receiving, from a neural network Optical Character Recognition (OCR) system, a first trained customizable neural network model, wherein the first trained customizable neural network model comprises a first architecture and a corresponding first data training set based on data field parameters of a first data field from a plurality of data fields from imagery of a physical document;
   receiving, from the neural network OCR system, a second trained customizable neural network model, wherein the second trained customizable neural network model comprises a second architecture and a corresponding second data training set based on data field parameters of a second data field from the plurality of data fields from the imagery of the physical document;
   extracting the first data field and the second data field from the imagery of the physical document, based on the first trained customizable neural network model and the second trained customizable neural network model, respectively;
   accumulating, in computer storage, the extracted first data field and the second data field, wherein the first data field and the second data field comprise at least a portion of the plurality of data fields of the physical document usable in a remote deposit transaction; and
   communicating the accumulated first data field and the second data field to a remote deposit process.

2. The computer-implemented method of claim 1, further comprising classifying the extracted first data field and the second data field.

3. The computer-implemented method of claim 2, further comprising generating a confidence score for the classification of the extracted first data field and the second data field.

4. The computer-implemented method of claim 1, further comprising:
   receiving, from the neural network OCR system, a third trained customizable neural network model, wherein the third trained customizable neural network model comprises a third architecture and a corresponding third data training set based on data field parameters of a third data field from the plurality of data fields from the imagery of the physical document;
   extracting the first data field, the second data field and the third data field from the imagery of the physical document by the first trained customizable neural network model, the second trained customizable neural network model, and the third trained customizable neural network model, respectively;
   accumulating, in computer storage, the extracted first data field, the second data field, and the third data field, wherein the first data field, the second data field, and the third data field comprise at least a portion of the plurality of data fields of the physical document usable in a remote deposit transaction; and communicating the accumulated first data field, the second data field, and the third data field to a remote deposit process.

5. The computer-implemented method of claim 1, further comprising:

receiving, from the neural network OCR system, a third trained customizable neural network model, wherein the third trained customizable neural network model implements any of the first architecture or the second architecture, while using a third data training set, based on a similarity of data field parameters of a third data field as compared to one or more of the data field parameters of the first data field or the second data field;

extracting the first data field, the second data field, and the third data field, from the imagery of the physical document, based on the first trained customizable neural network model, the second trained customizable neural network model, and the third trained customizable neural network model, respectively;

accumulating, in computer storage, the extracted first data field, the second data field, and the third data field, wherein the first data field, the second data field, and the third data field comprise at least a portion of the plurality of data fields of the physical document usable in a remote deposit transaction; and communicating the accumulated first data field, the second data field, and the third data field to a remote deposit process.

6. The computer-implemented method of claim 1, further comprising:

receiving, from the neural network OCR system, a third trained customizable neural network model, wherein the third trained customizable neural network model implements a modified version of any of the first architecture, or the second architecture, while using a third data training set, based on a similarity of data field parameters of a third data field as compared to one or more of the data field parameters of the first data field or the second data field;

extracting the first data field, the second data field, and the third data field, from the imagery of the physical document, based on the first trained customizable neural network model, the second trained customizable neural network model, and the third trained customizable neural network model, respectively;

accumulating, in computer storage, the extracted first data field, the second data field, and the third data field, wherein the first data field, the second data field, and the third data field comprise at least a portion of the plurality of data fields of the physical document usable in a remote deposit transaction; and communicating the accumulated first data field, the second data field, and the third data field to a remote deposit process.

7. The computer-implemented method of claim 1, further comprising:

receiving, from the neural network OCR system, a third trained customizable neural network model, wherein the third trained customizable neural network model implements a combination of one or more portions of the first architecture and the second architecture, while using a third data training set, based on a similarity of data field parameters of a third data field as compared to one or more of the data field parameters of the first data field or the second data field;

extracting the first data field, the second data field, and the third data field, from the imagery of the physical document, based on the first trained customizable neural network model, the second trained customizable neural network model, and the third trained customizable neural network model, respectively;

accumulating, in computer storage, the extracted first data field, the second data field, and the third data field, wherein the first data field, the second data field, and the third data field comprise at least a portion of the plurality of data fields of the physical document usable in a remote deposit transaction; and communicating the accumulated first data field, the second data field, and the third data field to a remote deposit process.

8. The computer-implemented method of claim 1, wherein the first architecture comprises a Residential Network (ResNet) architecture and the second architecture comprises a Transformer Architecture OCR (TrOCR).

9. The computer-implemented method of claim 1, wherein the first trained customizable neural network model comprises a categorical convolutional neural network (CNN) model and the second trained customizable neural network model comprises a region-based CNN model.

10. The computer-implemented method of claim 1, wherein the first architecture comprises any of: a Residential Network (ResNet) architecture, a Transformer Architecture OCR (TrOCR), a LeNet architecture, an AlexNet architecture, a VGG architecture, a GoogLeNet architecture, or a GoogleNet architecture.

11. The computer-implemented method of claim 1, wherein the first trained customizable neural network model and the second trained customizable neural network model are arranged in series during the extracting, and the accumulating comprises aggregating in series.

12. The computer-implemented method of claim 1, wherein the first trained customizable neural network model and the second trained customizable neural network model receive a replicated copy of the imagery of the physical document, are arranged in parallel during the extracting, and the accumulating comprises aggregating in parallel.

13. A system, comprising:

a memory; and at least one processor coupled to the memory and configured to:

receive, from a neural network Optical Character Recognition (OCR) system, a first trained customizable neural network model, wherein the first trained customizable neural network model comprises a first architecture and a corresponding first data training set based on data field parameters of a first data field from a plurality of data fields from imagery of a physical document;

receive, from the neural network OCR system, a second trained customizable neural network model, wherein the second trained customizable neural network model comprises a second architecture and a corresponding second data training set based on data field parameters of a second data field from the plurality of data fields of the imagery of the physical document;

extract the first data field and the second data field, from the imagery of the physical document, based on the first trained customizable neural network model and the second trained customizable neural network model, respectively;

accumulate, in the memory, the extracted first data field and the second data field, wherein the first data field and the second data field comprise at least a portion of the plurality of data fields of the physical document usable in a remote deposit transaction; and communicate the accumulated first data field and the second data field to a remote deposit process.

14. The system of claim 13, further configured to classify the extracted first data field and the second data field and generate a confidence score for the classification of the extracted first data field and the second data field.

15. The system of claim 13, further configured to:
receive, from the neural network OCR system, a third trained customizable neural network model, wherein the third trained customizable neural network model implements any of the first architecture, or the second architecture, while using a third data training set, based on a similarity of data field parameters of a third data field as compared to one or more of the data field parameters of the first data field or the second data field;
extract the first data field, the second data field, and the third data field, from the imagery of the physical document, based on the first trained customizable neural network model, the second trained customizable neural network model, and the third trained customizable neural network model, respectively;
accumulate, in the memory, the extracted first data field, the second data field, and the third data field, wherein the first data field, the second data field, and the third data field comprise at least a portion of the plurality of data fields of the physical document usable in a remote deposit transaction; and
communicate the accumulated first data field, the second data field, and the third data field to a remote deposit process.

16. The system of claim 13, wherein the first trained customizable neural network model comprises a categorical convolutional neural network (CNN) model and the second trained customizable neural network model comprises a region-based CNN model.

17. The system of claim 13, wherein the first architecture or the second architecture comprises any of: a Residential Network (ResNet) architecture, a Transformer Architecture OCR (TrOCR), a LeNet architecture, an AlexNet architecture, a VGG architecture, a GoogLeNet architecture, or a GoogleNet architecture.

18. The system of claim 13, wherein the first trained customizable neural network model and the second trained customizable neural network model are arranged in series during the extracting, and the accumulating comprises aggregating in series.

19. The system of claim 13, wherein the first trained customizable neural network model and the second trained customizable neural network model receive a replicated copy of the imagery of the physical document, are arranged in parallel during the extracting, and the accumulating comprises aggregating in parallel.

20. A non-transitory computer-readable device having instructions stored thereon that, when executed by at least one computing device, cause the at least one computing device to perform operations comprising:
receiving, from a neural network Optical Character Recognition (OCR) system, a first trained customizable neural network model, wherein the first trained customizable neural network model comprises a first architecture and a corresponding first data training set based on data field parameters of a first data field from a plurality of data fields from imagery of a physical document;
receiving, from the neural network OCR system, a second trained customizable neural network model, wherein the second trained customizable neural network model comprises a second architecture and a corresponding second data training set based on data field parameters of a second data field from the plurality of data fields from the imagery of the physical document;
extracting the first data field and the second data field, from the imagery of the physical document, based on the first trained customizable neural network model and the second trained customizable neural network model, respectively;
accumulating, in computer storage, the extracted first data field and the second data field, wherein the first data field and the second data field comprise at least a portion of the plurality of data fields of the physical document usable in a remote deposit transaction; and
communicating the accumulated first data field and the second data field to a remote deposit process.

* * * * *